(12) United States Patent
Hoyda et al.

(10) Patent No.: US 11,946,792 B2
(45) Date of Patent: Apr. 2, 2024

(54) LEVEL SENSOR

(71) Applicant: CLEAN AIR ZONE INC., Corona, NY (US)

(72) Inventors: Serge B. Hoyda, Great Neck, NY (US); Gregg Russell Dickinson, Briarwood, NY (US)

(73) Assignee: CLEAN AIR ZONE INC., Corona, NY (US)

( * ) Notice: Subject to any disclaimer, the term of this patent is extended or adjusted under 35 U.S.C. 154(b) by 15 days.

(21) Appl. No.: 17/852,341

(22) Filed: Jun. 28, 2022

(65) Prior Publication Data

US 2022/0412790 A1 Dec. 29, 2022

Related U.S. Application Data

(60) Provisional application No. 63/215,656, filed on Jun. 28, 2021.

(51) Int. Cl.
*G01F 23/18* (2006.01)
*G01F 25/20* (2022.01)

(52) U.S. Cl.
CPC ............ *G01F 25/20* (2022.01); *G01F 23/18* (2013.01)

(58) Field of Classification Search
CPC ......... G01F 23/14; G01F 23/18; G01F 23/185
See application file for complete search history.

(56) References Cited

U.S. PATENT DOCUMENTS

| 1,102,377 A | 7/1914 | Wilton |
| 2,638,644 A | 5/1953 | Rauhut |
| 4,689,302 A | 8/1987 | Goldberg et al. |

(Continued)

FOREIGN PATENT DOCUMENTS

| DE | 10 2016 120 534 | 11/2017 |
| EP | 0 328 782 | 8/1989 |

(Continued)

OTHER PUBLICATIONS

International Search Report in PCT/US22/35385 dated Oct. 5, 2022.
(Continued)

*Primary Examiner* — Herbert K Roberts
(74) *Attorney, Agent, or Firm* — Collard & Roe, P.C.; William Collard (57) ABSTRACT

There is disclosed a sensor system for determining a fluid level comprising a first sensor comprising a contact sensor a second sensor comprising a conductive sensor and a transducer configured to determine a water level based upon pressure placed on the transducer. There is also a microprocessor in communication with the first sensor, the second sensor and the transducer, the microprocessor configured to determine from at least one of the first sensor, the second sensor and the transducer, a fluid level in a container. In one embodiment the system further comprises a memory configured to feed values to the microprocessor, wherein the values comprise at least one of a high level fluid value and a low level fluid value. In one embodiment the microprocessor is configured to read pressure levels from the transducer wherein the pressure level of the transducer is configured to estimate a fluid level in a container.

10 Claims, 6 Drawing Sheets

(56) References Cited

U.S. PATENT DOCUMENTS

| | | | |
|---|---|---|---|
| 4,746,336 | A | 5/1988 | Mignot |
| 5,589,132 | A | 12/1996 | Zippel |
| 5,656,242 | A | 8/1997 | Morrow et al. |
| 5,756,899 | A | 5/1998 | Ugai et al. |
| 6,053,968 | A | 4/2000 | Miller |
| 6,500,244 | B2 | 12/2002 | Sanchez |
| 6,589,489 | B2 | 7/2003 | Morrow et al. |
| 6,810,732 | B2 | 11/2004 | Shon |
| 6,916,630 | B2 | 7/2005 | Sofer |
| 7,147,692 | B2 | 12/2006 | Fornai et al. |
| 7,665,358 | B2 | 2/2010 | Calabrese |
| 7,722,708 | B2 | 5/2010 | Powell, Jr. et al. |
| 8,083,837 | B2 | 12/2011 | Mazzanti et al. |
| 8,357,359 | B2 | 1/2013 | Woo et al. |
| 8,444,922 | B2 | 5/2013 | Kusuura |
| 8,748,167 | B2 | 6/2014 | Greene et al. |
| 9,044,700 | B2 | 6/2015 | Gruenbacher et al. |
| 9,327,223 | B2 | 5/2016 | Gruenbacher et al. |
| 9,573,088 | B2 | 2/2017 | Gruenbacher et al. |
| 9,579,597 | B2 | 2/2017 | Gruenbacher et al. |
| 2004/0184949 | A1 | 9/2004 | McEllen |
| 2006/0097411 | A1 | 5/2006 | Kim |
| 2006/0169141 | A1 | 8/2006 | Yuen |
| 2007/0122320 | A1 | 5/2007 | Pletcher et al. |
| 2008/0156015 | A1 | 7/2008 | Meyerholtz et al. |
| 2008/0271527 | A1* | 11/2008 | Hewitt ............... G01F 23/164 73/299 |
| 2010/0047117 | A1 | 2/2010 | Bernard |
| 2010/0154534 | A1* | 6/2010 | Hampton ............ G01F 23/265 73/304 C |
| 2011/0150814 | A1 | 6/2011 | Woo et al. |
| 2011/0303093 | A1 | 12/2011 | Jeung |
| 2011/0318817 | A1 | 12/2011 | Greene et al. |
| 2012/0167660 | A1 | 7/2012 | Calcote |
| 2012/0183488 | A1 | 7/2012 | Woo et al. |
| 2012/0183489 | A1 | 7/2012 | Woo et al. |
| 2013/0085204 | A1 | 4/2013 | Hollingshead et al. |
| 2014/0208781 | A1* | 7/2014 | Broadbent ............ F25C 5/185 62/66 |
| 2015/0266031 | A1 | 9/2015 | Mills et al. |
| 2017/0122600 | A1 | 5/2017 | Son et al. |
| 2019/0203960 | A1 | 7/2019 | Hoyda et al. |
| 2020/0064175 | A1* | 2/2020 | Krammer ............. G01F 23/14 |
| 2020/0179873 | A1 | 6/2020 | Hoyda et al. |
| 2022/0397440 | A1* | 12/2022 | Broadbent ............ F25C 1/25 |

FOREIGN PATENT DOCUMENTS

| | | | | |
|---|---|---|---|---|
| WO | 9407122 | A1 | 3/1994 | |
| WO | WO-2014162006 | A1 * | 10/2014 | ............ G01F 23/14 |
| WO | WO-2021190749 | A1 * | 9/2021 | ........... G01C 13/008 |

OTHER PUBLICATIONS

Written Opinion in PCT/US22/35385 dated Oct. 5, 2022.
International Search Report in PCT/US23/17771 dated Jun. 21, 2023.
Written Opinion of the Interntional Searching Authority in PCT/US23/17771 dated Jun. 21, 2023.
Notification of Transmittal of the International Search Report and the Written Opinion of the International Searching Authority in PCT/US23/17771 dated Jun. 21, 2023.
Notice of Allowance in Chinese Application No. 201880089590.6 dated Oct. 21, 2022.
International Preliminary Report on Patentability with Written Opinion of the International Searching Authority of PCT/US2018/067402, dated Jul. 2, 2020.
International Search Report in PCT/US2018/067402, dated Mar. 28, 2019.
Written Opinion of the International Searching Authority for PCT/US2018/067402, dated Mar. 28, 2019.
International Search Report in PCT/US2021/018133 dated Jun. 15, 2021.
Written Opinion of the International Searching Authority in PCT/US2021/018133 dated Jun. 15, 2021.
First Chinese Office Action in Chinese Application No. 201880089590.6 dated Oct. 27, 2021.
Second Chinese Office Action in Chinese Application No. 201880089590.6 dated Jun. 29, 2022.
Extended European Search Report in European Application No. 18892900.4 dated Oct. 8, 2021.
First Indian Examination Report in Indian Application No. 202027030194 dated Apr. 7, 2022.
International Preliminary Report on Patentability with Written Opinion of the International Searching Authority of PCT/US2021/018133 dated Aug. 11, 2022.
U.S. Office Action in U.S. Appl. No. 17/181,604 dated Aug. 31, 2023.
U.S. Office Action in U.S. Appl. No. 16/231,396 dated Oct. 30, 2019.
U.S. Final Office Action in U.S. Appl. No. 16/231,396 dated Apr. 20, 2020.
U.S. Advisory Action in U.S. Appl. No. 16/231,396 dated May 18, 2020.
U.S. Office Action in U.S. Appl. No. 16/231,396 dated Jun. 26, 2020.
U.S. Notice of Allowance in U.S. Appl. No. 16/231,396 dated Oct. 16, 2020.
U.S. Notice of Allowance in U.S. Appl. No. 16/231,396 dated Nov. 23, 2020.

\* cited by examiner

LEVEL SENSOR

CROSS REFERENCE TO RELATED APPLICATIONS

This application is a non-provisional application that claims priority to U.S. Provisional application Ser. No. 63/215,656 filed on Jun. 28, 2021 the disclosure of which is hereby incorporated herein by reference in its entirety.

BACKGROUND OF THE INVENTION

There are numerous level sensor devices available for detecting the fluid level in a tank. Some of these devices, function to indicate when a certain level or operating "point' has been reached by the fluid in the tank. Other sensors allow for continual measurement of the fluid level within the tank. In addition, fluid level sensors can be classified as either contact or non-contact sensors. There are a variety of non-contact sensor technologies including ultrasonic, external capacitive, laser (TOF), and others. Contact type sensors include float systems, conductive probes, and in-contact capacitive sensors. Another commonly used type of level sensor technology is based on measuring the hydrostatic pressure of a liquid and then converting this pressure measurement to a depth or level measurement using a mathematical algorithm tailored to the liquid be monitored. Pressure sensors used in this system can be submerged and in contact with the liquid or be used remotely and isolated from the liquid. It is this latter type that the invention described herein improves upon and addresses some issues not previously dealt with. There are several issues that prevent the use of hydrostatic pressure sensors for level monitoring in many applications. First there is the calibration of these sensors often use an empty container as a reference point (to establish offset compensation for manufacturing variances). In some applications calibration is needed or desired when the vessel contains a liquid and it is not convenient or possible to empty it. Second, In some applications it is desirable to monitor the level of a liquid "below" a high reference point and for these applications an alternate method of calibration is needed. Third, in many applications traditional methods of using pressure to indicate level requires manual calibration and/or procedures to account for natural variations in resolution and accuracy caused by manufacturing variances. Fourth, in critical applications a method is needed to monitor the performance of the sensor and detect failures.

SUMMARY OF THE INVENTION

Ultimately the device combines a pressure transducer and conductive probes that work together to provide a simple way to calibrate the level sensor without having to start with an empty tank or empty a tank of its contents in order to establish a baseline. The conductive components both act as calibration references and "fail-safe" high point alarms in the event of pressure transducer malfunction.

The sensor works in combination with a microprocessor to process the pressure data and convert it to a water level based on hydrostatic principles. The microcontroller also monitors conductive probes to complete automatic calibration and re-calibration when necessary. The sensor system can use AI functionality (now available with new microcontroller chipsets) to "learn" the normal behavior of a system requiring level control and recognize abnormal behavior as a fault that may indicate sensor or system failure.

This invention combines a conductive level sensor with a pressure sensor to allow for calibration to occur at fixed level above empty. The invention allows for re-calibration to occur without requiring a container to be placed in an empty state.

Because the calibration point is shifted to a "high" level, this invention can be used to accurately determine levels below the calibration point which can then be used for process control. In applications where the absolute level is not critical, this method can provide an advantage by reducing the production tolerances required in terms of matching the sensor to the container. This invention uses auto-calibration and can automatically compensate for any inaccuracies in the pressure sensor or variation due to manufacturing tolerances. This invention uses a microprocessor to convert the pressure data to liquid level data based on hydrostatic principles. In addition, this system can incorporate AI (artificial intelligence) and/or ANN (artificial neural network) techniques to allow for the invention to adapt to or "learn" the normal behavior of a process as regards liquid level fluctuations and detect anomalies that indicate a sensor failure.

Additional conductive probes can be added to allow for critical level detection in the event of pressure sensor failure. These provide "fail-safe" redundancy. The system contains the following key items: first, a high-resolution low range pressure transducer, second a communication interface connecting the transducer to a microprocessor. Third, an isolation sample channel utilizing a gas column (air) to isolate a liquid from the pressure transducer. Fourth a corrosion resistant conductive probes integral with the isolation column. Fifth, AI (artificial intelligence) and/or ANN (artificial neural network) to monitor normal system operation and determine sensor failure.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1A:
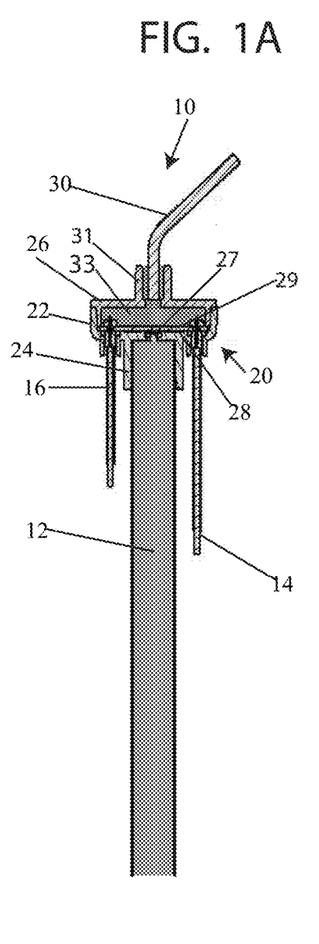
FIG. 1A is a cut away view of a first level sensor.
Figure 1B:
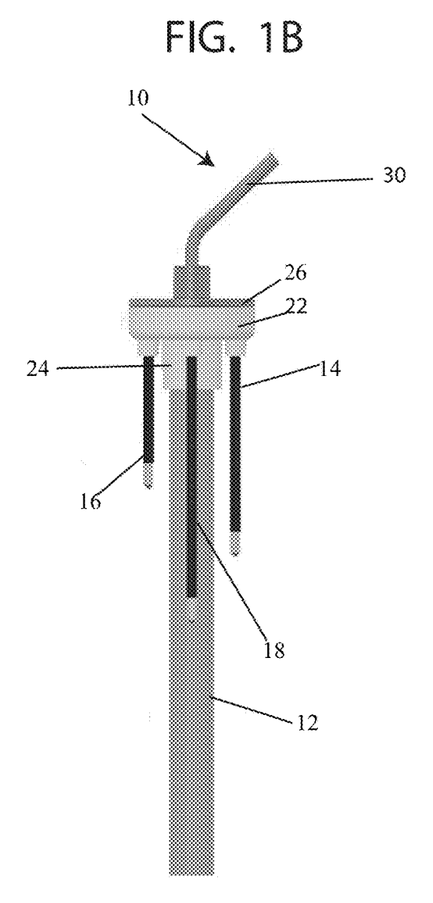
FIG. 1B is a solid view of a second level sensor.

Referring to the drawings, FIG. 1 shows a cut away view of the sensor 10 which comprises a main body comprising an isolation chamber 12, a plurality of conductive probes 14, 16 and 18 of differing lengths (See FIG. 1B). There is also a pressure transducer housing 20 having a base 22 and a top 26. In addition, on top of the isolation chamber 12 is a top cap 24 as well. Disposed inside of the pressure transducer housing 20 is a pressure transducer 27. The conductive probes 14, 16 and 18 are all coupled together via a coupling plate 28 which is disposed inside of the pressure transducer housing. The feed from the isolation chamber 12 feeds into the coupling plate 28. The pressure transducer 27 creates a signal based upon the pressure created on it based upon the water level in the isolation chamber. The signal from the pressure transducer 27 travels through cable 30 where it is then transmitted to a microprocessor (See FIG. 4).

FIG. 1B shows the outer surface of the sensor 10 which shows the isolation chamber 12. The isolation chamber is coupled to the top cap 24 which has a base 22 and a top 26. This view shows three sensors 14, 16 and 18 extending out from the top housing 20. Cable 30 is shown extending out of housing 20, wherein this cable 30 is in communication with the pressure transducer, the three sensors 14, 16 and 18 and also communicates downstream with a microprocessor (See FIG. 4).

Figure 2A:
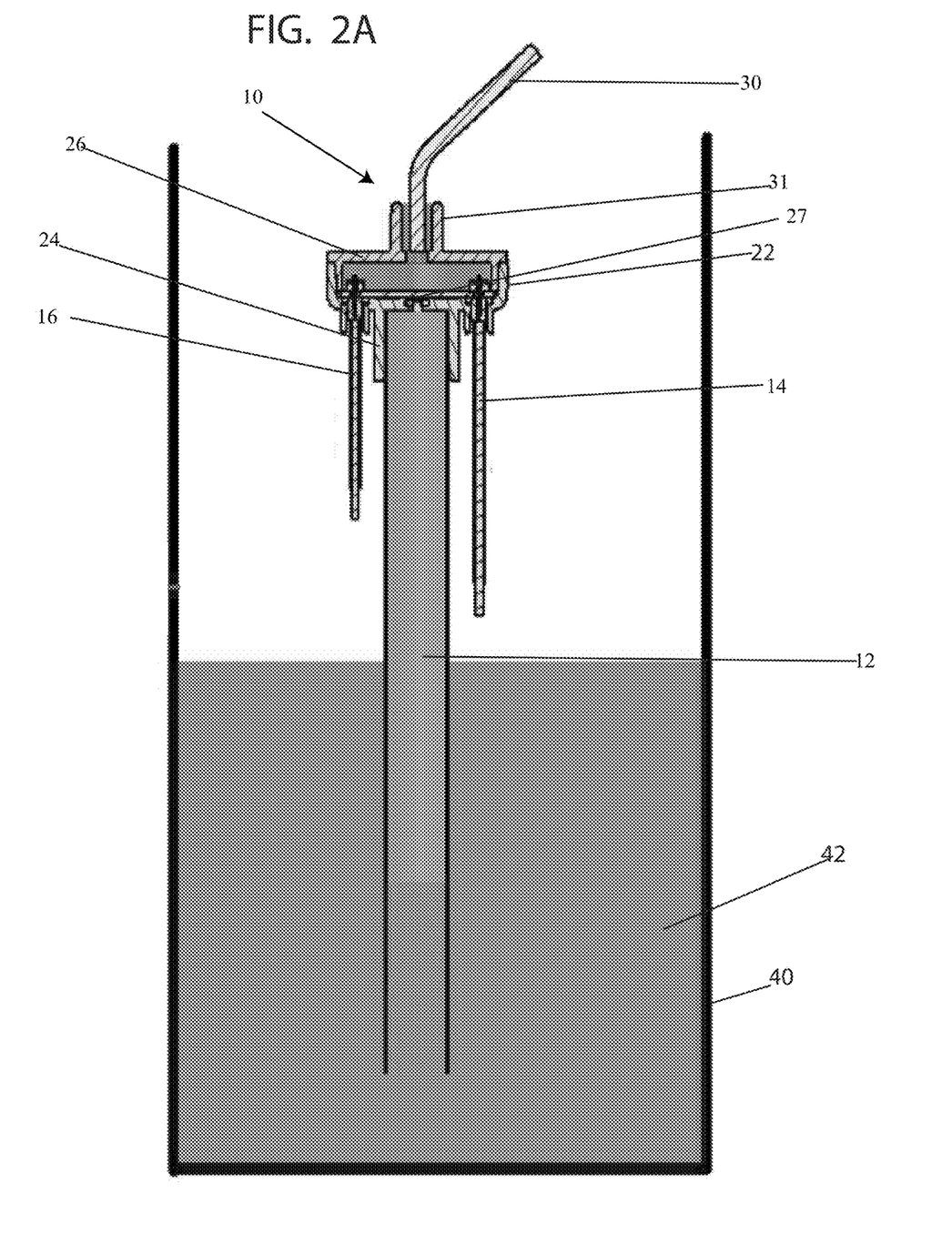
FIG. 2A is a view of the level sensor in operation.

FIG. 2A shows a side cross-sectional view of the sensor device immersed in a container of fluid. For example, there is shown an isolation chamber 12 which is shown immersed in fluid 42 inside of a container 40. Sensors 14 and 16 are shown, wherein these sensors 14 and 16 are coupled to coupling plate 28. Pressure transducer 27 is also coupled to coupling plate 28. Sensors 14, 16 (and 18) and transducer 27 are configured to send signals to cable 30 which sends these signals onto a microprocessor. With the isolation chamber receiving water therein as shown in this view this creates a pressure on transducer 27 which then sends a signal through wire 30 to microprocessor on the depth of the water in the container 40. The greater the amount of water or fluid in container 40, the greater the pressure on the isolation chamber 12 which results in greater pressure on transducer 27 which results in a signal extending through wire 30 and onto the microprocessor.

Figure 2B:
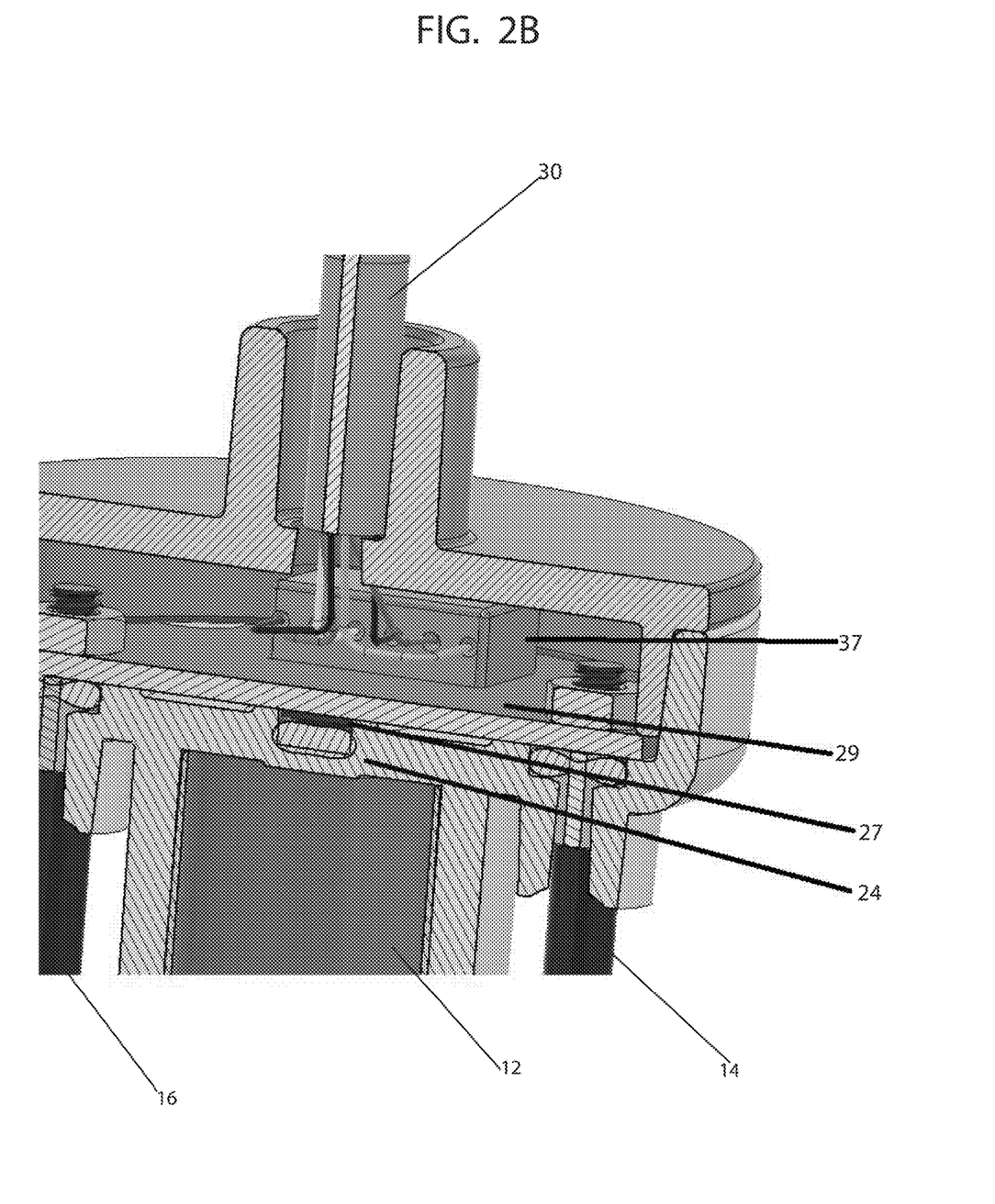
FIG. 2B is a side cross-sectional view of the components shown in FIG. 2A.

FIG. 2B is a side cross-sectional view of the components which shows a control box 37 which is coupled to the circuit board 29 and which relays control information to the cable or wire 30. As shown the circuit board 29 is coupled to the transducer 27 as well as to the sensors 14 and 16. Top cap 24 forms an O ring above isolation chamber 12. Thus, signals from the sensors 14 and 16 (as well as sensor 18) as well as signals from transducer 27 are sent through circuit board 29.

Figure 2C:
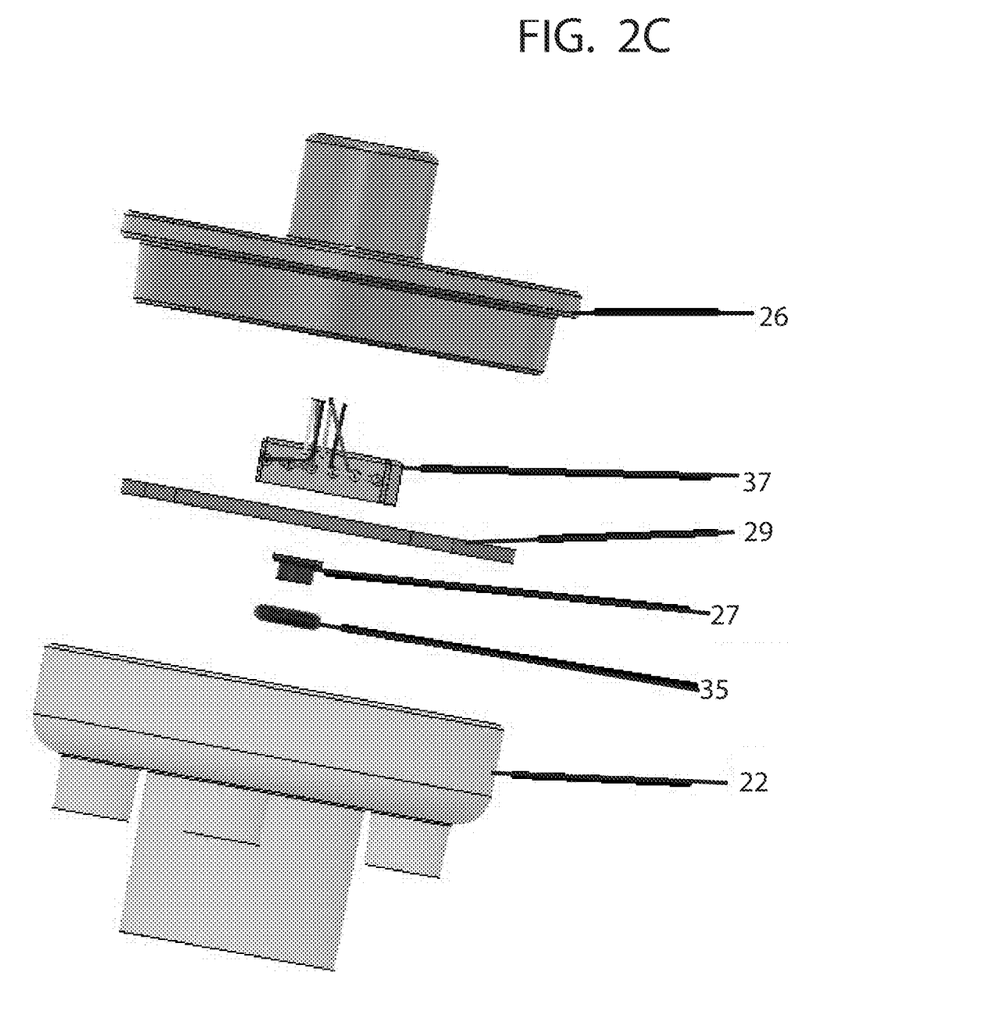
FIG. 2C is a side exploded view of these components.

FIG. 2C shows top 26, housing 22, with a plurality of components such as control box 37, circuit board 29, transducer 27 which is to be coupled to circuit board 29, O-ring 35 as well as housing 22. These components 37, 29, 27, and 35 are configured to fit inside of the housing formed from housing 22 and top 26.

Figure 3:
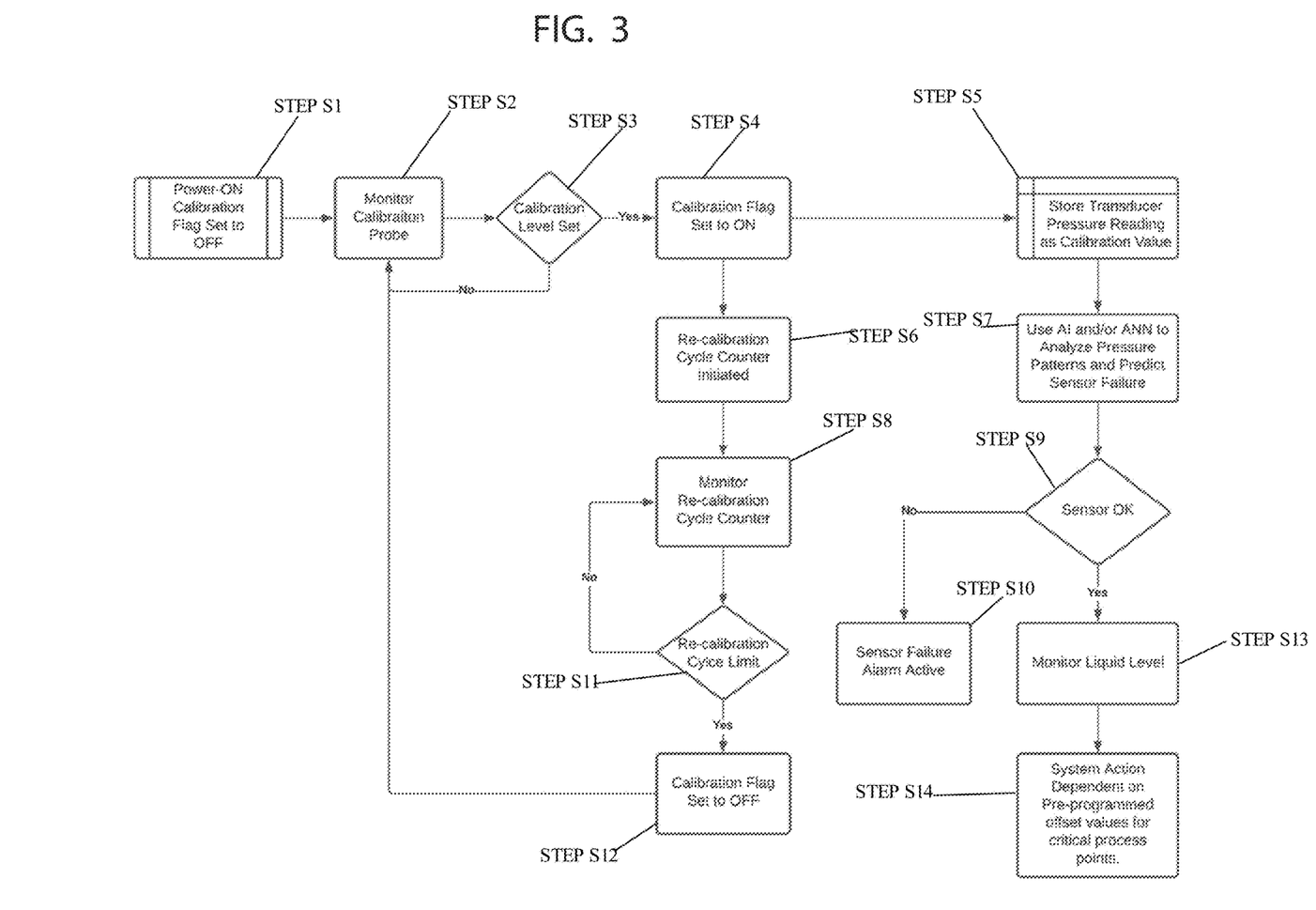
FIG. 3 is a view of the flow chart for the level sensor.

FIG. 3 shows the process for using the sensors with a container of fluid such as a container of fluid for an air purification machine. For example, the process starts in step S1 wherein the system turns on and calibrates itself. Next, in step S2 the system can monitor the calibration probe. Next, in step S3 the calibration level is set. Next, in step S4 a calibration flag is set to ON. Next, in step S5 the system can store the transducer pressure reading as a calibration value in a memory such as memory 52 (See FIG. 4). Simultaneously or adjacent in time, in step S6 there can be a recalibration cycle counter initiated this counter is initiated in microprocessor 50 which runs a counting program.

In step S7 the system such as microprocessor 50 can use AI (artificial intelligence) or ANN to analyze pressure patterns and to predict sensor failure. If in step S9 the system determines that the sensor is ok then the process proceeds to step S13 to monitor the liquid level. Next, in step S14 the system is action dependent on pre-programmed offset values for critical process points.

Alternatively, after step S6, the system can monitor the re-calibration cycle counter. Next, in step S11 the system can determine if there is a recalibration cycle limit. If there is no cycle limit then the system proceeds back to step S8. Alternatively, if the calibration limit is hit in step S11, the system proceeds to step S12 wherein a calibration flag is set to Off. If the calibration flag is set to off then the process can proceed to step S2 wherein it can monitor the calibration probe.

In addition, in the alternative to step S9, if the system determines that the sensor is not OK, then the process proceeds to step S10 wherein there is a sensor failure and the alarm becomes active.

Figure 4:
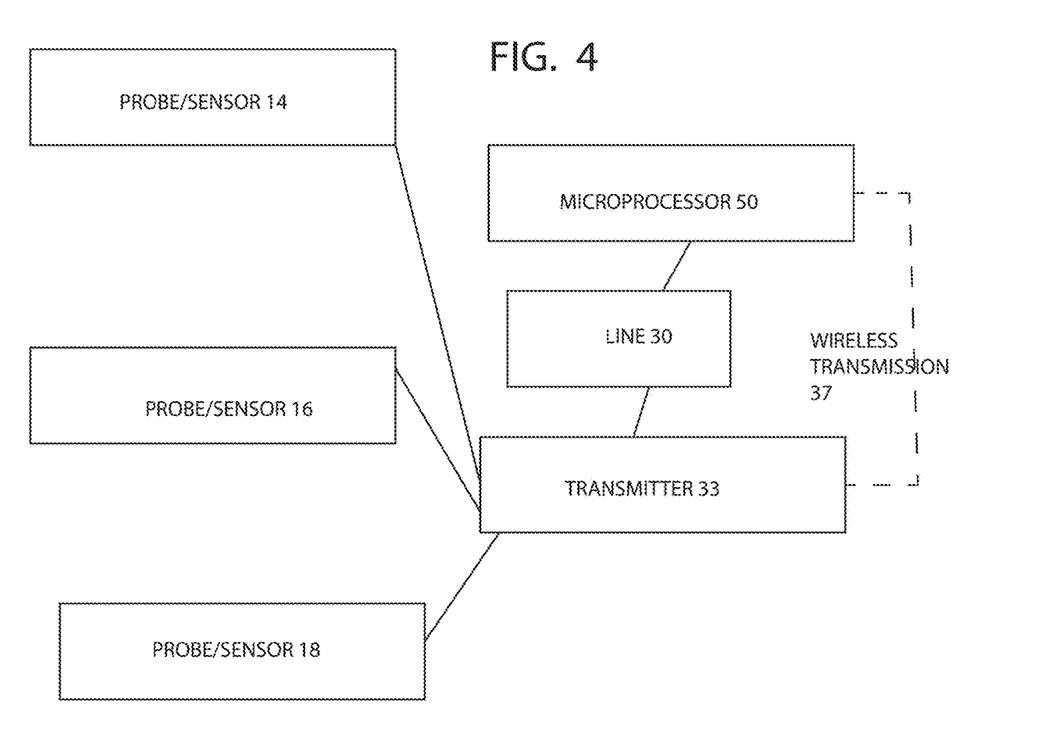
FIG. 4 is a schematic block diagram of the overall network which communicates between microprocessors and sensors.

FIG. 4 is a schematic block diagram of the sensor system which comprises a plurality of sensors including a conductive sensor 14, a calibration sensor 16 and an additional sensor 18. There is also a transducer which receives pressure from an air pocket inside of the isolation chamber, wherein the pressure form the air pocket increases as the fluid level rises inside of chamber 40. Transmitter 33 which is disposed inside of housing 20 transmits a signal form any one of sensor 14, sensor 16, sensor 18 and transducer 27 through transmitter, through either line 30 or wireless transmission 37 to outside electrical components. These outside electrical components can be in the form of a microprocessor 50 and/or a memory 52. Memory 52 can be either integrated with microprocessor 50 or be a separate component. Memory 52 can be used to store the values associated with setting the high and low levels for reading fluid in a chamber such as chamber 40. When the low level is reached, (such as below a tip of sensor 18) microprocessor 50 can then signal a water feed or a fluid feed 54 in the form of a valve to allow additional water or additional fluid to be added. Alternatively, if microprocessor 50 determines that the amount of fluid is too high (such as above a predetermined level determined by transducer 27 or sensor 16) then it can signal a drain 56 which is in the form of a drain valve to open to allow water to flow out of the system. Alternatively, if microprocessor determines that a top level of fluid has entered the chamber 40 it can simply shut off fluid feed 54 and allow the fluid to settle. The settling of the fluid over time can result in evaporation so that eventually the fluid levels may drop.

In at least one embodiment a change in the liquid level causes a proportional change in the isolated air column 12. The connected microprocessor uses the pressure sensed by the transducer such as transducer 27 to calculate the liquid level column height of the container. The microprocessor uses a signal from the calibration probe 16 to establish a calibration point for the start level. The controller or microprocessor is pre-programmed with off-set values for important process levels referenced to this calibration point. In at least one embodiment, the three different sensors 14, 16 and 18 each of different length are configured to measure a fluid or water height inside of a container as well as the transducer 27. In at least one embodiment, the sensors 14, 16 and 18 are formed as contact sensors, such that when the water or fluid contacts these sensors it indicates a level of the water based upon the position of the tip of each sensor. Simultaneously and/or alternatively, the transducer 27 also measures the height of the water in a container based upon the pressure read by the transducer (see above). For example, the input of fluid or water into a container can be triggered by a reading of the pressure levels of transducer 27 or by the water falling below sensor 18, thereby prompting an indication to increase the level of water in the system. Alternatively, when the pressure levels on transducer 27 reach a different level such as when the fluid levels are high and when the fluid reaches a lower tip of sensor 16, the water or fluid input into the system can shut down. Thus, the sensors 14, 16 and 18 can be used in parallel with transducer 27 to calibrate transducer 27 to provide more accurate readings.

Accordingly, while at least one embodiment of the present invention have been shown and described, it is to be understood that many changes and modifications may be made thereunto without departing from the spirit and scope of the invention as defined in the appended claims.

What is claimed is:

1. A sensor system for determining a fluid level comprising:
a housing;
a first water level sensor comprising a contact sensor said first water level sensor coupled to the housing but disposed outside of said housing;
a second water level sensor comprising a conductive sensor said second water level sensor coupled to the housing but disposed outside of said housing;
an isolation chamber formed integral with said housing;
a transducer configured to determine a water level based upon pressure placed on said transducer said transducer being disposed in said housing;
a microprocessor in communication with said first water level sensor, said second water level sensor and said transducer, said microprocessor configured to determine from at least one of said first water level sensor, said second water level sensor and said transducer, a fluid level in a container.

2. The sensor system as in claim 1, further comprising a memory configured to feed values to said microprocessor, wherein said values comprise at least one of a high level fluid value and a low level fluid value.

3. The sensor system as in claim 2, wherein said microprocessor is configured to read pressure levels from said transducer wherein said pressure level of said transducer is configured to estimate a fluid level in a container.

4. The sensor system as in claim 3, wherein said isolation chamber is configured to trap air inside said isolation chamber wherein when a fluid level rises inside of a container, a pressure inside of said isolation chamber rises to create greater pressure on said transducer causing said transducer to send a signal that the fluid level is rising wherein said first level sensor and said second level sensor are disposed outside of said isolation chamber.

5. The sensor system as in claim 4, wherein said memory stores values of pressure readings from the transducer and associated level readings for a level of the fluid based upon the pressure readings.

6. The sensor system as in claim 5, wherein the microprocessor is configured to selectively open a fluid feed or close a fluid feed based upon a set value stored in either said memory or in said microprocessor.

7. The sensor system as in claim 6, wherein said microprocessor is configured to selectively open a drain depending on said set value.

8. The sensor system as in claim 7, further comprising a circuit board, wherein the transducer is coupled to the circuit board.

9. The sensor system as in claim 8, wherein the first sensor, the second sensor and the transducer are coupled to the circuit board.

10. The sensor system as in claim 9, wherein said isolation chamber coupled to the transducer, wherein when a pressure rises in said isolation chamber, it acts on said transducer to produce a signal which is emitted from said transducer to said circuit board.

* * * * *